March 7, 1933.  E. UHLICH ET AL  1,899,999
SUN AND PLANET WHEEL GEAR
Filed March 28, 1930  3 Sheets-Sheet 1
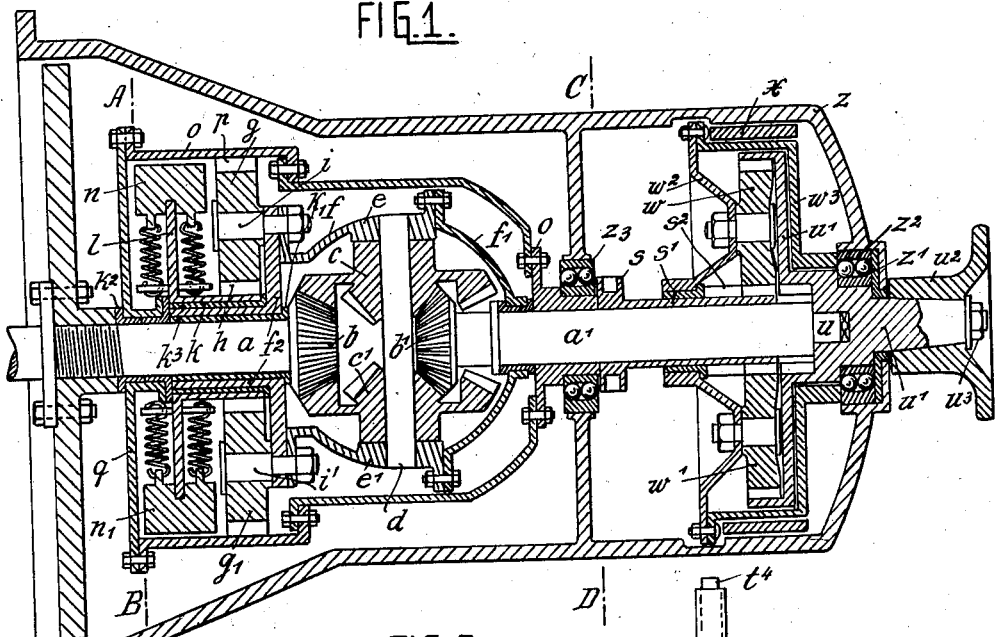
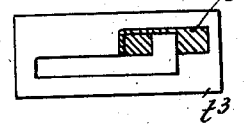
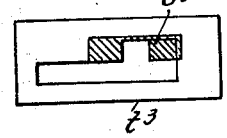
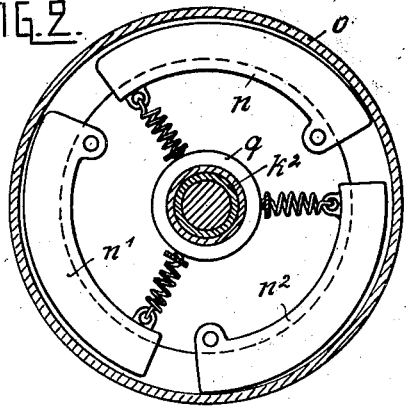
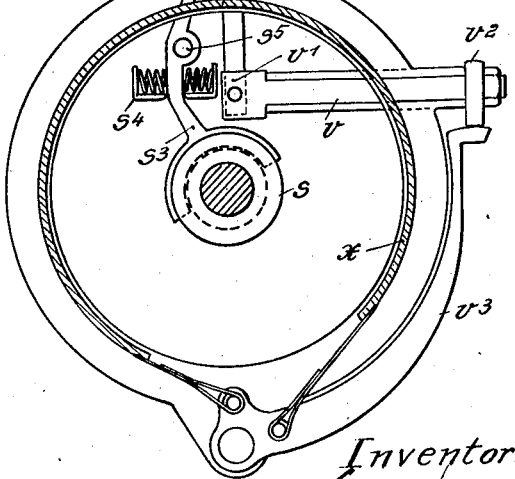
Inventors March 7, 1933. E. UHLICH ET AL 1,899,999

SUN AND PLANET WHEEL GEAR

Filed March 28, 1930 3 Sheets-Sheet 2

Inventors

March 7, 1933.  E. UHLICH ET AL  1,899,999
SUN AND PLANET WHEEL GEAR
Filed March 28, 1930  3 Sheets-Sheet 3

Inventors

Patented Mar. 7, 1933

1,899,999

UNITED STATES PATENT OFFICE

ERICH UHLICH AND WALTER BALLENTIN, GENANNT MIELKE, OF BERLIN-HIRSCH-GARTEN, GERMANY

SUN AND PLANET WHEEL GEAR

Application filed March 28, 1930, Serial No. 439,632, and in Germany March 28, 1929.

This invention relates to sun and planet wheel gears or epicyclic gear-drives, which may be used especially in connection with motor-driven vehicles, such as automobiles, motor cars and the like.

Drives of this kind have been proposed in which there are used two individual gear-systems connected in series with each other and some of these known drives also comprise a common carrier for the planet wheels.

The new sun and planet wheel gear which forms part of our present invention is intended to serve in the first place to solve two problems by the aid of essentially the same devices. On the one hand, the new gear provides an automatic regulation by action of the load to be driven by the gear, in such a way that the most favorable gradual ratio of gearing or reduction of speed may be attained for the conditions prevailing at a time and on the other hand said gear will be automatically thrown into and out of operation by action of its own speed of rotation. In order to obtain a common or general solution for both of these problems, there are used in the first place devices whereby on the one hand the torque exerted by the brakes, when in engaged condition, and on the other hand the counter-action of the member which carries the brake surface will be transmitted to the driven shaft in such a manner that these two forces will mutually reinforce each other.

A further problem which is successfully solved by our present invention consists in transmitting the aforementioned two driving forces, viz. the torque exerted by the brakes and the counter-action of the member which carries the braking surface not in a direct but in an indirect way, that is by means of intermediate transmission gears.

In all constructions of the sun and planet wheel gear which forms part of our present invention, individual gear-systems are used which operate in series connection with each other, said individual gear-systems being adapted to mutually control each other by means of a common carrier for different planet wheels. Either sun-wheel of the said two serially connected individual gear-systems is operatively connected with the driven shaft, although not in every case by means of a particular driving member. In addition to this, between the second sun-wheel of either individual gear-system and the driven shaft there is provided a clutch which acts by centrifugal force. The sun-wheels in the present case may either consist of pinions having the form of spur-gears or also of gear-wheels with internal teeth. In all constructions forming part of my invention braking does not need to be exerted on the casing in particular and may in every case be exerted on the carriers for the planet-wheels, while the special organs which form part of the brake may be of any desired known construction. The control rods for the brake must be constructed in accordance with the one or other kind of braking organs used.

In the drawings we have shown three forms of construction of sun and planet wheel gears forming part of our present invention.

In the form of construction shown in Figs. 1 to 5 the new sun and planet wheel gear consists of two individual systems of planet wheel gears which are rigidly connected with each other by means of a carrier and co-operate with a centrifugal clutch which serves for the transmission of power. A further, third, individual plant wheel gear-system is used in order to effect backward motion, no-load motion and braking by hand and in addition to this, in order to throw-in the driving organs which produce forward speed.

With the second form of construction of our new sun and planet wheel gear it will be possible to unite the two first aforementioned individual planet wheel gears in an especial manner and to dispense with said third individual planet wheel gear-system.

The third form of construction according to our invention is shown in Fig. 8 in which case there are likewise used only two individual planet wheel gear-systems comprising a carrier for the planet wheels which are not rigidly connected with each other. This construction solves the problem of constructing a sun and planet wheel gear which is of extremely small dimensions and of very simple construction.

In the drawings, Fig. 1 is an axial longitudinal section, Fig. 2 a cross-section along line A—B of the clutch, Fig. 3 a cross-section along line C—D showing some details of the control mechanism including an operating lever etc. These parts are omitted in Fig. 1 for the sake of clearness. Figs. 4 and 5 show some details, Fig. 6 is an axial longitudinal section through another form of construction of our new sun and planet wheel gear, Fig. 7 a diagrammatical front view thereof and Fig. 8 a longitudinal section in axial direction through a third form of construction of my present sun and planet wheel gear.

From Fig. 1 it will be seen that the motor shaft $a$ carries a pinion $b$ which engages with two oppositely positioned pinions $c$ and $c_1$ constructed in the manner of stepped wheels carried by the rotating shaft of the planet wheels. The members $c$ and $c_1$ serve for fastening the shaft of the planet wheels. Preferably a pressure or thrust bearing is inserted intermediate the pinion $c$ and the member $e$ as well as intermediate the pinion $c_1$ and the member $e_1$. The members $e$ and $e_1$ are preferably constructed to form parts of the casing which encloses the carrier for the planet wheels, which casing in the present case consists of two parts $f$ and $f_1$. The planet wheels $g$ and $g_1$ are mounted in the usual manner on pivots $i$ and $i_1$ on the planet wheel carrier $f_2$ which is rigidly connected to the part $f$ of the casing. By means of the pivots $i$ and $i_1$ the part $f$ of the casing may in addition be connected with the planet wheel carrier $f_2$. The planet wheels $g$ and $g_1$ are in mesh with the sun or central wheel $h$ mounted on the bushing $k$. The latter is carried by a part of the casing enclosing the planet wheel carrier $f_2$, said part of the casing being constructed in the form of a hollow shaft. The outer end of the bushing $k$ carries a disk $l$ to which the shoes $n$ and $n_1$ of the centrifugal clutch are pivoted by means of bolts permitting outward motion of said shoes against the action of springs. The number of these shoes may be chosen in accordance with the specific purpose of use, for instance, three, six or another number of shoes being taken. The brake which is composed of the disk $l$, the brake shoes $n$ and $n_1$ etc., acts upon the braking surface of the casing $o$. This braking surface is provided interiorly of said casing $o$, as shown in Fig. 1, said braking surface may, however, also be an exterior surface provided, for instance, on the outside of the wheel rim $p$, permitting the length of the gear construction to be reduced by properly changing the dimensions of the several parts. At another place the casing $o$ carries the wheel rim $p$ having internal teeth on which the planet wheels $g$ and $g_1$ may roll. The several parts of which this casing is composed, viz: the rim $p$ with internal teeth, the braking surface, the shaft $a_1$ and the intermediate members are rigidly connected with each other. The wheel $b_1$ and the shaft $a_1$ are preferably made integral with each other. The cover $q$ which serves for closing up the casing $o$ is provided with a central flange projecting into the casing and may be used together with a part $k_2$ having the form of a stuffing box as a spacing member between the shafts, wheels and bushings which are carried by the main shaft $a$. These members comprise the bushing $k_1$, the planet wheel carrier $f_2$, the bushings $k_3$ and $k$ and the sun or central wheel $h$.

The differential gear wheel $b_1$ is carried by the driving shaft $a_1$ which ends into a pivot $u$ positioned within the bearing $u_1$. Mounted upon the bearing $u_1$ is the crosspiece $u_2$ of the Cardan drive and the end screw $u_3$. Within longitudinal grooves in the shaft $a_1$ is slidably mounted a catch member $s$ which is equipped with a companion member $s_1$ of usual construction for the claw member $s_3$ carried by the operating lever. The catch $s$ which is integral with the catch wheel $s_2$ and said member $s_1$ is provided interiorly with longitudinal grooves and with an exterior toothed catch wheel $s_2$, the pitch of the teeth of said catch wheel being equal to that of the teeth of the planet wheels $w$ and $w_1$, mounted on their carrier $w_2$. The casing $u_1$ for the planet wheels is provided with internal teeth upon which the planet wheels $w$ and $w_1$ may roll. The part $w_3$ is constructed as a brake-drum coherent with the carrier $w_2$ for the planet wheels $w$ and $w_1$. The fixed casing $z$ is equipped with a ball-bearing. Preferably the above mentioned member $s_1$ is made integral with the catch $s$ and eventually with the catch wheel $s_2$. The casing $o$ is filled with a lubricant in order to provide proper lubrication between the cover $q$ and the carriers $w_2$ and $w_3$. The lubricant is prevented to come in contact with the remaining parts contained in the casing. A packing consisting of felt or similar material closes up the ball-bearing $z_2$ towards the outside.

Fig. 2 is a view of the spring operated brake shoes $n$, $n_1$ and $n_2$ which are provided within the casing $o$.

Fig. 3 shows that the catch $s$ is actuated in known manner by the claw $s_3$ carried by the operating lever $t$. The safety device $s_4$ serves to retain the claw $s_3$ in its temporary position, while the slide pivot $s_5$ of known construction is preferably fixed on the central wall of the casing $z$ (not shown).

Figure 6:
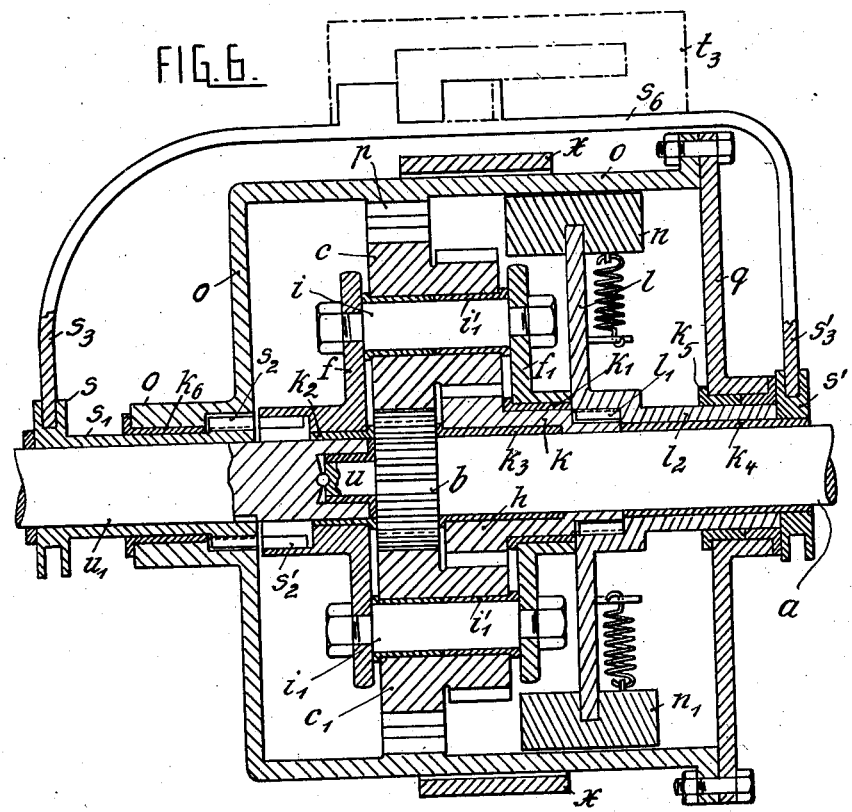

The slot $t_3$ is provided with an oblong hole which may be opened and closed by the left-hand portion of the aperture in the upper part of the lever carrying the slidable claw $s_3$ as may be seen from Fig. 4.

The right-hand portion of the oblong hole in the slot $t_3$ permits full forward and rearward motion of the operating lever $t$ to actuate the hand brake which consists of the brake lever $v_1$, the shaft $v$, the eccentric $v_2$, the brake lever $v_3$ and the brake band $x$. A pawl-and-ratchet device $t_1$, $t_2$, $t_3$ and $t_4$ of usual construction is likewise employed as shown in Fig. 3.

The aforedescribed device operates as follows:

If the car has come to standstill after shutting off the gas it will only be necessary to again supply gas in order to start the car. In this case the operating lever is in its front position, that is, when positioned within the aperture which is produced according to Fig. 5 intermediate the slot $t_3$ and the claw $s_3$. The catch $s$ is moved from the position as shown in Fig. 1 to its outermost right-hand position and the sun or central wheel $s_2$ is projected into the casing $u_1$. In consequence thereof the Cardan shaft is rigidly connected with the driving shaft $a_1$ and the wheel $b_1$. Connected with the shaft $a_1$ is the casing $o$ as had above been described and the wheel rim $p$ having internal teeth. All parts mentioned will now be fixed in position due to the kinetic energy of the car.

If now the motor is started, the planet wheels $c$ and $c_1$, the planet wheel shaft $d$, the casing member $f$, the carrier $f_2$ for the planet wheels as well as the planet wheels $g$ and $g_1$ themselves will be carried with the rotating motor shaft in accordance with the gear ratio. The planet wheels $g$ and $g_1$ now will impart rotation to the sun or central wheel $h$ and therewith to the disk $l$ as well as to the brake shoes connected with said disk, said brake shoes sliding in dependence of the speed of rotation against the action of springs upon the braking surface. At small speeds the sun and planet wheel gear as described will act in the manner of a free-wheel mechanism and with increasing speed of the motor shaft $a$ the brake shoes $n$ and $n_2$ will gradually be pressed against the braking surface $o$, thus exerting a braking effect upon the sun or central wheel $h$, the kinetic energy of the casing $o$ due to the rotation thereof being gradually decreased on account of the friction arising between the brake shoes and the braking surface. When transmitting the motion of the sun or central wheel $h$ by way of the planet wheels, the same effect will be exerted upon the internal teeth of the casing $o$. With increasing braking pressure between the brake shoes $n$ and $n_2$ and the casing $o$ the effect of braking exerted on the sun or central wheel as well as the power which is transmitted by the planet wheels $g$ and $g_1$ to the wheel rim $p$ with internal teeth or to the casing $o$ which latter now commences to rotate in the direction of rotation of the motor shaft.

The planet wheel drive $b$, $b_1$ and $c$, $c_1$, when operated in the aforedescribed manner may serve as a speed reduction gear by the action which is exerted by the casing $f$ upon the carrier $f_1$ and the planet wheels $g$ and $g_1$. As the speed of rotation of the casing $o$ and of the shaft $a_1$ approaches the speed of rotation of the driving shaft $a$, the relative motion of all parts of the drive decreases until all parts have assumed the same speed of rotation, thus coming to rest relatively to each other.

If the car travels up-hill, the speed of rotation of the shaft $a_1$, and in consequence thereof the pressure exerted by the brake shoes $n$ upon the braking surface will decrease and in accordance therewith the speed.

If it is desired to stop the car, the supply of fuel to the motor is throttled or cut-off.

In no-load condition of the sun and planet wheel gear the operating lever is introduced into the aperture which is formed on account of the fact that the shaft $a_1$ overlaps the claw $s_3$. In this condtion of the drive the catch $s$ is positioned outside of the casing $u_1$ as shown in Fig. 1. If the motor in this condition of the drive rotates at high speed, the drive will rotate without any relative motion between its operating parts and the Cardan shaft will be at rest being in uncoupled condition. In the aforementioned third planet wheel gear there will be a relative motion of the planet wheels $w$ and $w_1$ with respect to the casing $u_1$, this relative motion being due to the rotation of the sun or central wheel $s_2$.

For backward travel of the car the operating lever which is positioned within the slot $s_3$, as shown in Fig. 4, is entirely retracted and the catch $s$ remains in the last-mentioned position. The brake band $x$ now will be placed upon the member $w_3$, therewith keeping the carrier for the planet wheels in fixed position. The planet wheel $w_1$ and the carrier $w_2$ now rotate by action of the shaft $a$ or by action of the sun or central wheel $s_1$ and the casing $u_1$ so that the Cardan shaft now rotates in a direction opposite to the former direction of rotation.

The brake is actuated by means of the operating lever which moves the upper lever of the claw into the position shown in Fig. 5, which causes the catch $s$ to move towards the right and the sun wheel $s_2$ to be coupled with the brake $x$.

According to Fig. 6 the motor shaft $a$ is supported with the pressure pivot $u$ in the Cardan shaft $u_1$. At the end of the shaft $a$ in front of the pivot $u$ there is provided a pinion $b$ in the form of a spur-gear preferably integral with the shaft, said pinion serving as a driving member meshing with the planet wheels $c$ and $c_1$. These planet wheels rotate freely upon bushings $i'$ and $i'_1$ which terminate on both sides into a planet wheel $f$, $f_1$. This carrier for the purpose of permitting uniform reception of the load is made of two parts. The part $f$ rotates freely by means of a bushing $k_2$ upon the shaft $u_1$, while the part $f_1$ rotates freely together with the bushing $k_1$ around the hollow shaft $k$ which is connected with the sun or central wheel. This sun or central wheel together with the hollow shaft $k$ rotates freely with the bushing $k_3$ around the shaft $a$. A tooth gearing is provided at the end of the hollow shaft $k$, said tooth gearing being in mesh with the flange $l$ of the centrifugal clutch. The brake shoes $n$ and $n_1$ come in engagement against the action of springs with the braking surfaces provided on the interior wall of the casing $o$. This casing is preferably of cylindrical form having a cover $q$ and rotates together with the bushing $k_6$ upon the hollow shaft of the catch $s$, $s_1$. The other side of the casing, viz. the part of the cover $q$ which is constructed as a bearing rotates together with the bushing $k_5$ upon an extension $l_2$ of the flange $l$, said extension having the form of a hollow shaft. The end of the bushing $k_5$ is engaged from the outside by a second catch $s'$ which rotates with the bushing $k_4$ freely around the shaft.

Figure 7:
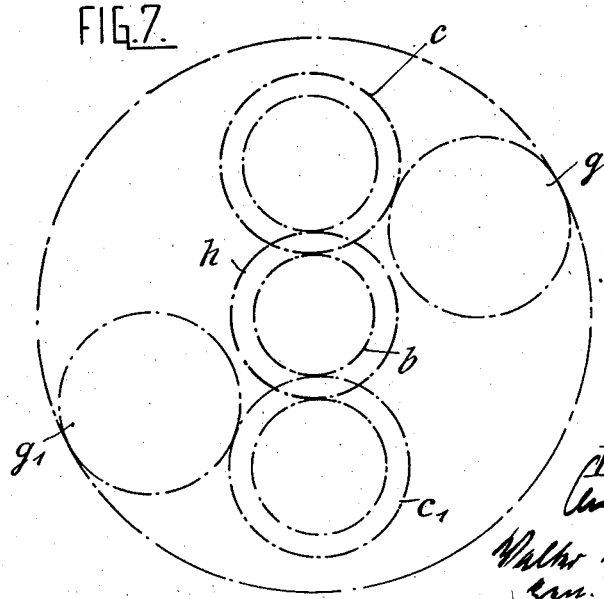

As Fig. 7 shows, the planet wheels $c$ and $c_1$ are in mesh with the outer planet wheels $g$ and $g'$ whose pivots are likewise carried by the two-part planet wheel carrier composed of the two parts $f$ and $f_1$. The outer wheels $g$ and $g'$ mesh with internal teeth $p$ on the casing $o$. A lateral extension of the carrier for the planet wheels is provided with internal teeth $s'_2$ meshing with the external teeth $s_2$. The latter are connected by means of a groove and tongue with the bushing $s_1$ which is longitudinally displaceably on the shaft $u_1$. The external teeth $s_2$ on the other hand may be made to mesh with internal teeth constructed to agree with the teeth $s'_2$ on the casing $o$. In order to prevent the catch $s$ against being pulled too far towards the outside which would result in a contact between the teeth $s_2$ and the wall of the casing $o$, the end position of the catch is fixed by a collar, stop or the like. With the aid of the catch $s'$ the extension $l_2$ and therewith the entire centrifugal clutch $l$, $n$ is mounted displaceably in longitudinal direction upon the bushing $k_4$ permitting engagement and disengagement of the internal teeth $l_1$ on the flange of the brake with and from the companion external teeth on the extension $k$ of the sun or central wheel $h$. The brake band is designated with $x$.

The brake lever $t$ in connection with the above described first form of construction of the drive merges into a clip or bail $s_6$ which carries the claws $s$.

The hereinabove described bushings may also be replaced by ball-bearings to produce a minimum of friction between the several parts which are in motion relatively to each other. The use of ball-bearings, in addition, will reduce the size of the entire drive.

Fig. 6 shows the drive in that position which is assumed by the several parts during forward travel of the car.

When starting the motor and rotating the shaft $a$, the stepped planet wheels $c$ and $c_1$ are rotated by the pinion $b$ in opposite directions and engage with the part which meshes with said pinion $b$ the planet wheels $g$ and $g_1$, thus forcing the latter to rotate in the direction of the shaft $a$. The planet wheels $g$ and $g_1$ would now transmit this direction of rotation in accordance with the size of the driving pinion $b$ relatively to the wheel rim $p$ with internal teeth to the casing $o$ and therewith to the driven shaft. The result in this case is a transmission gear of the usual kind known in connection with other sun and planet wheel gears, if the carrier for the planet wheels $f$ and $f_1$ be kept fixed in space, as is frequently the case in known constructions. If it is desired to solve the aforementioned problem of automatic regulation, this possibility of a constant reduction of speed does not need to be made use of and instead of the planet wheels the casing $o$ is kept fixed relatively to the wheel rim $p$ by action of the load to be carried by the drive. In this manner the parts $f$ and $f_1$ of the casing will be forced to rotate in backward direction.

The stepped planet wheels $c$ and $c_1$ which do not mesh with the driving pinion $b$, however, are in mesh with the sun wheel $h$ which is connected by way of the bushing $k$, the teeth $l_1$, the disk $l$, the brake shoes $n$ and $n_1$ etc. The sun wheel $h$ is rotated by action of the stepped planet wheels $c$ and $c_1$ in the direction of rotation of the driving shaft $a$, deducting the opposite rotation of the parts $f$ and $f_1$. The speed of rotation of the several parts, relatively to each other, will be determined by the size of said parts. The rotation thus imparted to the sun wheel, therefore, will be a rotation in the sense of the driving shaft $a$ the effect being that the brake shoes which are fastened to the sun wheel $h$ are subject to the action of centrifugal force. In case of a sufficiently high speed, the latter will overpower the force of the springs acting upon the brake and the no-load condition of the drive which has so far prevailed will be discontinued, the brake shoes acting indirectly on the braking surface and directly in case of forward travel of the car.

Free rotation of the plant wheels $c$ and $c_1$ and $g$ and $g_1$ will be impeded due to braking the sun wheel. In order to facilitate further rolling motion of the wheels $g$ and $g_1$ upon the wheel rim $p$, the said wheels $g$ and $g_1$ must be pressed with increased force into the teeth on the outer large sun wheel $p$. This increased pressure takes place in the direction towards the driving shaft and in case of proper acceleration of the motor, said pressure will assume a value of such magnitude, that it will be sufficient in connection with the driving force to overpower the kinetic energy of the casing $o$ and therewith of the driven shaft.

The casing $o$ starts to rotate together with the driven shaft and the speed of said casing will gradually approach the speed of the driving shaft $a$. In this condition of operation all parts of the drive are at rest relatively to each other and form merely a unitary rotating mass.

Upon decreasing speed of rotation due to increased load on the driven shaft, the centrifugal force of the brake members will be diminished and a reduction of speed now takes place in accordance with said increased load.

Figure 8:
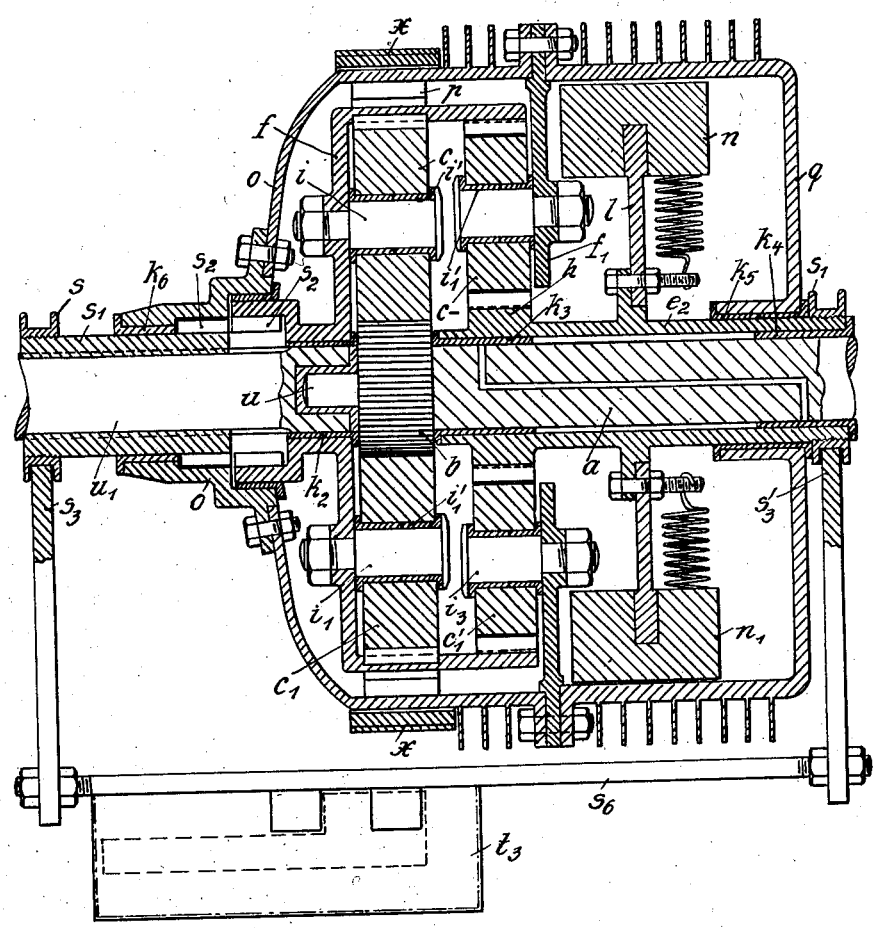

The arrangement of the third form of construction as shown in Fig. 8 follows immediately from the drawings in connection with the aforegiven description of the second form of our present sun and planet wheel gear. Evidently according to Fig. 8 there are likewise only two systems of planet gears connected with each other. The carrier of the system of planet gears on the left-hand side is carried by a bushing $k_2$ of the shaft $u_1$, while the planet wheel carrier $f$ is mounted in the casing $o$, $q$ and consequently in connection with the sleeves $k_6$ and $k_5$ of the bushings $s$ and $l_2$. These two carriers are therefore not rigidly connected with each other. A particular feature of this construction consists therein that the casing $f$ is perforated permitting passage of the outer planet wheels $g$ and $g_1$, as shown in Fig. 7.

According to Fig. 8 the planet wheels will cooperate with each other in the manner described in connection with Fig. 7. Accordingly, the mode of operation of this drive will be in agreement with that of the aforedescribed drive. The construction according to Fig. 8 is a particularly simple and effective sun and planet wheel gear. When using the term "sun wheel", "central wheel" or the like we desire of being understood that we do not desire to designate a wheel which is necessarily positioned upon the central shaft of the drive but to include also a drum with internal teeth. Furthermore, the connection of the several gears in series should not be understood as necessitating a unidirectional force or the like, since a drive having wheels which exert a mutual effect upon each other may likewise be used. The forces in this case may be of different directions depending upon the specific mode of operation of the drive. Furthermore the clutch organ or coupling member does not need to be arranged within the space between the two sun wheels or central wheels. Kinematically speaking, this clutch acts as if it would be positioned between said two wheels. Also the one sun or central wheel of the two gear wheel systems is not with necessity rigidly connected with the driven shaft.

We claim:

1. A sun and planet wheel gear, especially for motor-driven vehicles, comprising a motor-driven shaft, a sun wheel driven by said shaft, a pair of stepped wheels co-operative with said sun wheel, a second pair of planet wheels, a carrier common to both of said pairs of planet wheels, a wheel rim having internal teeth in mesh with said second pair of planet wheels, and a clutch geared to one of the planet wheels of said first pair.

2. A sun and planet wheel gear comprising a motor-driven shaft, a sun wheel driven by said shaft, a pair of interior stepped planet wheels co-operative with said sun wheel, a further pair of exterior planet wheels, a common carrier for both pairs of planet wheels, a wheel rim having internal teeth engaging with said pair of exterior planet wheels, and a clutch geared to one of the planet wheels of said first pair.

3. A sun and planet wheel gear, especially for motor-driven vehicles, comprising two individual systems of sun and planet wheel gears, the sun wheel of one of said systems being connected with a shaft to be driven, a centrifugal clutch inserted between the second sun wheel of one of said systems and said shaft, a carrier for the planet wheels, a toothed gear on said carrier, a casing for said sun and planet wheel gear, a toothed gear on said casing in proximity to said toothed gear on said carrier, a motor shaft, a Cardan shaft, a catch longitudinally displaceable on said Cardan shaft, a toothed gear co-operative with said catch, a casing having a toothed gear permitting to engage upon displacement of said catch either with said toothed gear on said casing or with said toothed gear on said carrier, a second catch freely rotatable on said motor shaft permitting upon said displacement of said latter catch to engage and disengage said latter catch with and from a gear wheel connected to said sun wheel.

4. A sun and planet wheel gear, as specified by claim 3, in which the second catch carries a flange forming part of said centrifugal clutch.

5. A sun and planet wheel gear, as specified by claim 2, having a bell-shaped carrier for the interior planet wheels, and a perforation on one side of said carrier, said perforation permitting the pair of exterior planet wheels which mesh with the interior planet wheels to project through said perforation, and an exterior toothed gear on said carrier in mesh with the other pair of planet wheels.

6. Transmission gearing of the character described comprising, in combination with driving and driven shafts, differential speed gearing connecting said shafts, including a sun wheel gear freely revoluble on the driven shaft, planet wheel gears in mesh with said sun wheel gear, a support for the planet wheel gears rotatable relative to the driving and driven shafts, means connected with the driving shaft for rotating said support, a member geared to the planet wheels rotatable as a unit therewith about the sun wheel and also independently thereof, and a centrifugal clutch interposed between said member and one of said shafts.

7. Transmission gearing as described in claim 6 in which means is provided connecting the centrifugal clutch with said sun wheel gear.

8. Transmission gearing as described in claim 6 in which said member consists of a gear having a drum-shaped extension supported upon the driving and driven shafts and encasing the sun and planet gears and the centrifugal clutch.

9. Transmission gearing of the character described, comprising, in combination with driving and driven shafts, differential speed gearing connecting said shafts including a sun wheel gear on one of said shafts, planet wheel gears in mesh with said sun wheel gear, a support for said planet wheel gears, means for rotatively connecting said support with the other of said shafts or disconnecting the same therefrom, a revoluble casing enclosing said gearing and having an internal gear in mesh with the planet wheel gears, clutch means shiftable into and out of connected relation with the sun wheel gear and adapted to engage the wall of said casing to connect said gear and casing for rotation as a unit, and a single manually operable means for simultaneously actuating the means connecting the planet wheel gear support to the second named shaft to establish such connection and for shifting said clutch means to disconnect the same from the sun wheel gear.

In testimony whereof, we affix our signatures.

ERICH UHLICH.
WALTER BALLENTIN, gen. MIELKE.